(12) United States Patent
Nguyen et al.

(10) Patent No.: US 9,790,774 B2
(45) Date of Patent: Oct. 17, 2017

(54) GENERATING AND MAINTAINING CONDUCTIVITY OF MICROFRACTURES IN TIGHT FORMATIONS BY GENERATING GAS AND HEAT

(71) Applicant: Halliburton Energy Services, Inc., Houston, TX (US)

(72) Inventors: Philip D. Nguyen, Houston, TX (US); Loan Vo, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/033,217

(22) PCT Filed: Jan. 2, 2014

(86) PCT No.: PCT/US2014/010021
§ 371 (c)(1),
(2) Date: Apr. 29, 2016

(87) PCT Pub. No.: WO2015/102629
PCT Pub. Date: Jul. 9, 2015

(65) Prior Publication Data
US 2016/0265326 A1    Sep. 15, 2016

(51) Int. Cl.
*E21B 43/24* (2006.01)
*E21B 43/267* (2006.01)
(Continued)

(52) U.S. Cl.
CPC .......... *E21B 43/2405* (2013.01); *C09K 8/592* (2013.01); *C09K 8/62* (2013.01);
(Continued)

(58) Field of Classification Search
CPC ...... E21B 43/243; E21B 43/24; E21B 43/247; E21B 43/267; E21B 43/2405
See application file for complete search history.

(56) References Cited

U.S. PATENT DOCUMENTS 6,439,309 B1    8/2002    Matherly et al.
6,722,434 B2    4/2004    Reddy et al.
(Continued)

FOREIGN PATENT DOCUMENTS

EP    2527586 A1    11/2012
WO    2015102629 A1    7/2015

OTHER PUBLICATIONS

International Search Report and Written Opinion for PCT/US2014/010021 dated Oct. 10, 2014.

*Primary Examiner* — Catherine Loikith
(74) *Attorney, Agent, or Firm* — McDermott Will & Emery LLP

(57) ABSTRACT

Methods for creating or enhancing a fracture in a subterranean formation include introducing a pad fluid into a formation at a rate and pressure sufficient to create or enhance at least one fracture therein. The pad fluid can include a pad base fluid, micro-proppant particulates, a gas-generating chemical, and an activator, and wherein either the gas-generating chemical or the activator or both are encapsulated. The methods can include placing the micro-proppant particulates, etc. into the fracture; releasing the activator from its encapsulation; reacting the gas-generating chemical and the activator in the fracture so as to generate gas and heat, thereby creating or enhancing at least one microfracture therein; introducing a fracturing fluid into the formation, wherein the fracturing fluid comprises a fracturing base fluid and macro-proppant particulates and placing the macroproppant particulates into the fracture so as to form a proppant pack therein.

20 Claims, 1 Drawing Sheet

(51) Int. Cl.
  *C09K 8/62*     (2006.01)
  *C09K 8/70*     (2006.01)
  *C09K 8/80*     (2006.01)
  *C09K 8/92*     (2006.01)
  *C09K 8/592*    (2006.01)
  *E21B 43/26*    (2006.01)

(52) U.S. Cl.
  CPC ............ *C09K 8/70* (2013.01); *C09K 8/80* (2013.01); *C09K 8/805* (2013.01); *C09K 8/92* (2013.01); *E21B 43/26* (2013.01); *E21B 43/267* (2013.01)

(56) References Cited

U.S. PATENT DOCUMENTS

| | | |
|---|---|---|
| 6,992,048 B2 | 1/2006 | Reddy et al. |
| 8,082,992 B2 | 12/2011 | Todd et al. |
| 2005/0269099 A1 | 12/2005 | Stegent et al. |
| 2011/0120712 A1 | 5/2011 | Todd et al. |
| 2012/0024530 A1 | 2/2012 | Todd et al. |
| 2012/0055593 A1 | 3/2012 | Kobayashi |
| 2012/0207843 A1 | 8/2012 | Lebon et al. |
| 2012/0227967 A1 | 9/2012 | Shaikh et al. |
| 2013/0180720 A1 | 7/2013 | Al-Dahlan et al. |
| 2013/0284437 A1 | 10/2013 | Nguyen et al. |
| 2016/0304770 A1* | 10/2016 | Nguyen ............ C09K 8/66 |

\* cited by examiner

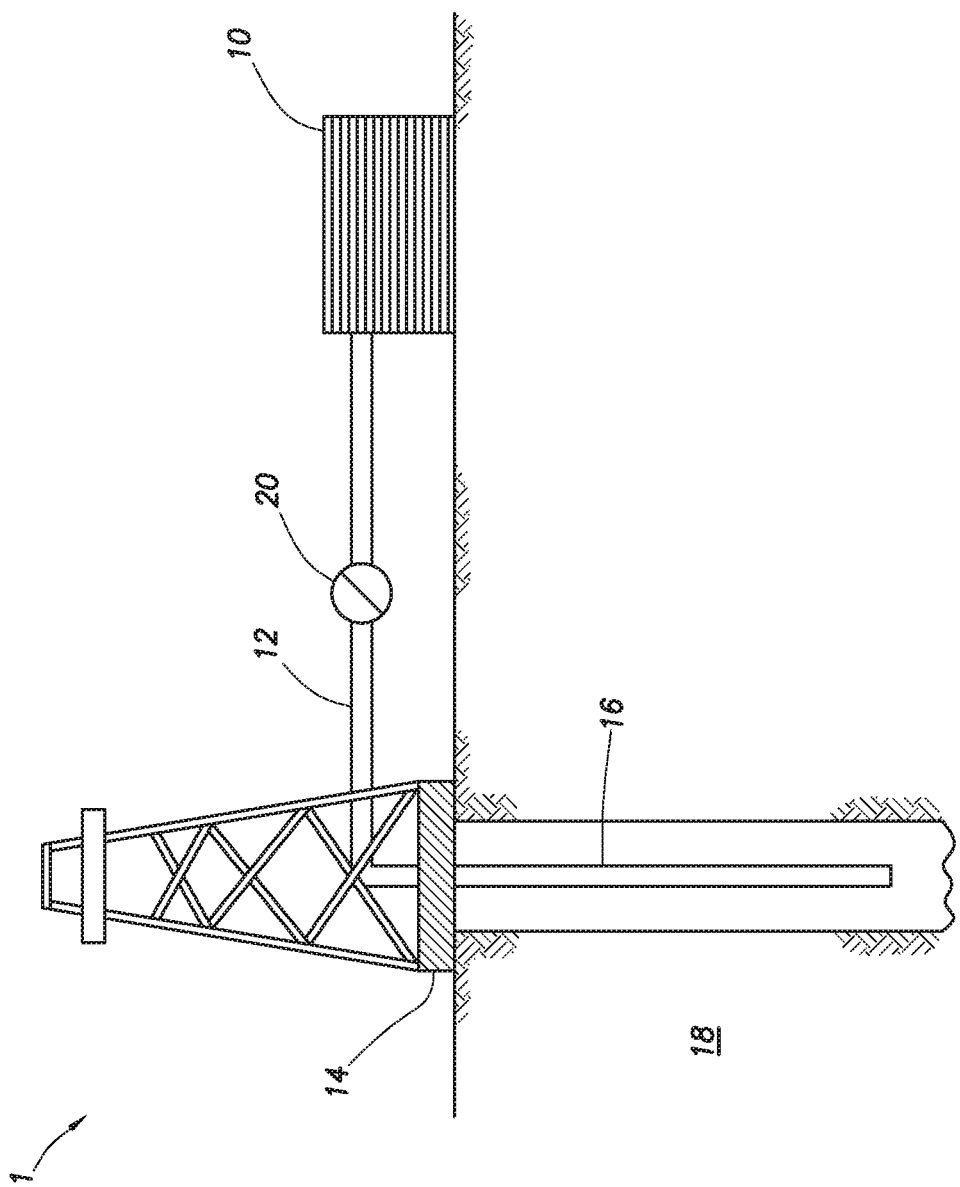

GENERATING AND MAINTAINING CONDUCTIVITY OF MICROFRACTURES IN TIGHT FORMATIONS BY GENERATING GAS AND HEAT

BACKGROUND

The embodiments described herein relate to generating and maintaining the conductivity of microfractures in tight formation by generating gas and heat.

Subterranean wells (e.g., hydrocarbon producing wells, gas producing wells, water producing wells, and the like) are often stimulated by hydraulic fracturing treatments. In traditional hydraulic fracturing treatments, a treatment fluid, which may also function simultaneously or subsequently as a carrier fluid, is pumped into a portion of a subterranean formation (which may also be referred to herein simply as a "formation") at a rate and pressure sufficient to break down the formation and create one or more fractures therein. Typically, particulate solids, such as graded sand, are suspended in a portion of the treatment fluid and then deposited into the fractures. The particulate solids, known as "proppant particulates" (which may also be referred to herein as "proppant" or "propping particulates") serve to prevent the fractures from fully closing once the hydraulic pressure is removed. By keeping the fractures from fully closing, the proppant particulates aid in forming conductive paths through which fluids produced from the formation flow, referred to as a "proppant pack." The degree of success of a stimulation operation depends, at least in part, upon the porosity of the proppant pack to permit the flow of fluids through the interconnected interstitial spaces between abutting proppant particulates.

In the case of stimulating low permeability formations (or "low permeability formations"), such as shale reservoirs or tight-gas sands, increasing fracture complexity during stimulation may enhance the production of the formation. Low permeability formations, such as those described herein, tend to have a naturally occurring network of multiple interconnected fractures referred to as "fracture complexity." As used herein, the term "low permeability formation" refers to a formation that has a matrix permeability of less than 1,000 microDarcy (equivalent to 1 milliDarcy). As used herein, the term "ultra-low permeability formation" refers to a formation that has a matrix permeability of less than 1 microDarcy (equivalent to 0.001 milliDarcy). As used herein, unless otherwise stated, the term "fracture" or "fractures" will refer collectively to micro-sized fractures (referred to herein as "microfractures") and fractures having larger openings (referred to herein as "macrofractures").

Fracture complexity may be enhanced by stimulation (e.g., fracturing) operations to create new or enhance (e.g., elongate or widen) existing fractures. In such cases, the newly formed fractures may remain open without the assistance of proppant or micro-proppant particulates due to shear offset of the formation forming the fractures, or may have included therein proppant or micro-proppant particulates, depending on the size of the fracture, to assist in keeping them open after hydraulic pressure is removed. The inclusion of proppant or micro-proppant particulates in the fractures, new or natural, may increase the conductivity of a low permeability formation.

In some cases, subterranean treatment operations (e.g., stimulation, proppant placement, micro-proppant placement, and the like), may be supplemented with enhanced oil recovery techniques. Such enhanced oil recovery techniques may operate to enhance the conductivity of fractures. One such technique is acidizing, which involves injecting an acid (e.g., hydrochloric acid) into a subterranean formation in order to etch channels or create microfractures in the face of the formation and/or within an existing macrofracture or microfracture, thereby enhancing the conductivity of the formation. The acid may create a branched, dendritic-like network of channels through which produced fluids may flow.

Acidizing may operate to supplement or enhance the conductivity and production of the formation. Acidizing treatments are preferentially performed at multiple intervals or zones in a subterranean formation so as to maximize fracture complexity. However, such multiple interval treatments may be limited due to acid spending or leak off. If the acid is spent or experiences leak off prior to reaching one or more desired intervals of the subterranean formation (e.g., by leak off in a first or earlier contacted desired interval), it may be insufficiently potent to etch channels and, thus, may not contribute to or may only minimally contribute to enhancing fracture complexity and conductivity.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the fluids of the embodiments described herein to a downhole location.

DETAILED DESCRIPTION

The embodiments described herein relate to generating and maintaining the conductivity of microfractures in tight formation by generating gas and heat. Specifically, the embodiments described herein relate to reacting a gas-generating chemical and an activator within a fracture (e.g., a macrofracture or a microfracture) to produce gas and heat sufficient to create or enhance at least one microfracture therein. The gas and heat may be generated in situ by delaying contact between the gas-generating chemical and the activator until reaching a desired interval or location downhole within a subterranean formation. Micro-proppant and proppant particulates may be used to prop open the microfractures and the fractures. As used herein, the term "microfracture" refers to a natural or secondary discontinuity in a portion of a subterranean formation creating a flow channel. As used herein, the term "macrofracture" refers to a discontinuity in a portion of a subterranean formation creating a flow channel, the flow channel generally having a diameter or flow size opening greater than about the size of a microfracture. In some cases, a fracture may have, for example, an asterix shape, such that the main body of the fracture is the size of a macrofracture but the tips of the projections are small enough to qualify as microfractures. In such cases, the main body of the fracture is used to determine the type of fracture and, thus, the asterix shaped fracture would be referred to as a macrofracture. The microfractures and macrofractures may be channels, perforations, holes, or any other ablation within the formation.

Although some embodiments described herein are illustrated by reference to stimulation treatments (e.g., fracturing), the methods and compositions disclosed herein may be used in any subterranean formation operation that may benefit from their gas generating properties. Such treatment operations may include, but are not limited to, a drilling operation; a stimulation operation; a hydraulic stimulation operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof. Furthermore, the embodiments described herein may be used in full-scale subterranean operations or pills. As used herein, the term "pill" refers to a relatively small volume of specially prepared fluid (e.g., drilling fluid) placed or circulated in a wellbore. The subterranean formation may be any source rock comprising organic matter (e.g., oil or natural gas), such as shale, sandstone, or limestone and may be subsea.

Moreover, the methods and compositions described herein may be used in any non-subterranean operation that may benefit from their gas generating properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Increasing fracture complexity in subterranean formations, particularly in tight subterranean formations, may increase the conductivity and productivity of the formation. The permeability of a formation is a measure of the formation's resistance to through-flow fluid. Thus, low permeability formations require considerable applied pressure in order to flow fluid through its pore spaces, as compared to formations having higher permeabilities.

Examples of such low permeability formations include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 milliDarcy ("mD") ($9.869233 \times 10^{-19}$ m$^2$), and even as low as less than about 0.0001 mD ($9.869233 \times 10^{-20}$ m$^2$). Tight-gas sands are low permeability formations that produce mainly dry natural gas and may include tight-gas carbonates, tight-gas shales, coal-bed methane, and the like. Tight-gas sands may have permeabilities as low as less than about 1 mD ($9.869233 \times 10^{-16}$ m$^2$), and even as low as less than about 0.01 mD ($9.869233 \times 10^{-18}$ m$^2$).

In some embodiments disclosed herein, a method is provided comprising providing a subterranean formation. A pad fluid comprising a pad base fluid, micro-proppant particulates, a gas generating chemical, and an encapsulated activator may be introduced into the subterranean formation at a rate and pressure sufficient to create or enhance at least one fracture. The at least one fracture may be either a macrofracture or a microfracture, or combinations thereof. The micro-proppant particulates may be placed into the fracture, along with the gas-generating chemical and the encapsulated activator. In some embodiments, the micro-proppant may be placed into the far reaches of a macrofracture, which may be very small, or within a microfracture to prop open portions or all of those fractures after hydraulic pressure is removed. The activator may then be released from its encapsulation, such as, for example, upon encountering a particular stimuli (e.g., temperature, pH, salinity, the passage of time, and the like). The activator and the gas-generating chemical may then contact one another within the fracture and react together so as to generate gas and heat. The increased pressure and temperature as a result of the gas and heat released from the reaction of gas generator and activator may overcome the tensile strength of the formation, thereby leading to the formation or extension of microfractures. Thereafter, a fracturing fluid comprising a fracturing base fluid and macro-proppant particulates may be introduced into the subterranean formation so as to place the proppant particulates within the fracture and form a proppant pack therein. The proppant pack may be formed by both the micro-proppant particulates and the macro-proppant particulates. In some embodiments, the fracturing fluid may be introduced into the subterranean formation at the same pressure as the pad fluid (i.e., above the fracture gradient). In some embodiments, the steps of introducing the pad fluid and the fracturing fluid may be repeated at a second treatment interval and up to as many treatment intervals as are present in a subterranean formation, depending on the operations being performed.

As used herein, the term "micro-proppant particulates" and all of its variants (e.g., "micro-proppant") refers to particulates capable of holding fractures (e.g., microfractures) open after a hydraulic fracturing treatment and having a size in the range of from a lower limit of about 1 μm, 10 μm, 20 μm, 30 μm, 40 μm, 50 μm, 60 μm, 70 μm, and 80 μm to an upper limit of about 150 μm, 140 μm, 130 μm, 120 μm, 110 μm, 100 μm, 90 μm, and 80 μm. As used herein, the term "macro-proppant particulates" refers to particles capable of holding fractures (e.g., macrofractures) open after a hydraulic fracturing treatment and having a size greater than micro-proppant particulates, which may be in the range of from a lower limit of about 100 µm, 200 µm, 300 µm, 400 µm, 500 µm, 600 µm, 700 µm, 800 µm, 900 µm, 1000 µm, 1100 µm, 1200 µm, and 1300 µm to an upper limit of about 2500 µm, 2400 µm, 2300 µm, 2200 µm, 2100 µm, 2000 µm, 1900 µm, 1800 µm, 1700 µm, 1600 µm, 1500 µm, 1400 µm, and 1300 µm. Micro-proppant particulates and macro-proppant particulates may be referred to collectively herein as "proppant particulates" or "proppant."

In some embodiments disclosed herein, a method is provided comprising providing a subterranean formation. A pad fluid comprising a pad base fluid, micro-proppant particulates, an encapsulated gas generating chemical, and an activator may be introduced into the subterranean formation at a rate and pressure sufficient to create or enhance at least one fracture therein. The at least one fracture may be either a macrofracture or a microfracture, or combinations thereof. The micro-proppant particulates may be placed into the fracture, along with the encapsulated gas-generating chemical and the activator. In some embodiments, the micro-proppant may be placed into the far reaches of a macrofracture, which may be very small, or within a microfracture to prop open portions or all of those fractures after hydraulic pressure is removed. The gas-generating chemical may then be released from its encapsulation, such as, for example, upon encountering a particular stimuli (e.g., temperature, pH, salinity, the passage of time, and the like). The activator and the gas-generating chemical may then contact one another within the fracture and react together so as to generate gas and heat. The increased pressure and temperature as a result of the gas and heat released from the reaction of gas generator and activator may overcome the tensile strength of the formation, thereby leading to the formation or extension of microfractures. Thereafter, a fracturing fluid comprising a fracturing base fluid and macro-proppant particulates may be introduced into the subterranean formation so as to place the proppant particulates within the fracture and form a proppant pack therein. The proppant pack may be formed by both the micro-proppant particulates and the macro-proppant particulates. In some embodiments, the fracturing fluid may be introduced into the subterranean formation at the same pressure as the pad fluid (i.e., above the fracture gradient). In some embodiments, the steps of introducing the pad fluid and the fracturing fluid may be repeated at least a second treatment interval and up to as many treatment intervals as are present in a subterranean formation, depending on the operations being performed.

In some embodiments, the gas-generating chemical and the activator may both be encapsulated. In other embodiments, either the gas-generating chemical or the activator may be encapsulated. The encapsulation serves to ensure that the gas-generating chemical and the activator do not react until they reach a desired interval or location within a subterranean formation (e.g., within the micro- or macrofractures formed therein). That is, the encapsulation prevents the gas-generating chemical and the activator from contacting one another and reacting. After placing the gas-generating chemical and the activator in a subterranean formation at a desired interval, the encapsulation surrounding either or both of the gas-generating chemical and the activator may be removed (e.g., degraded or otherwise eroded) such that the two components may react to create gas and heat. In some embodiments, the encapsulating material may be a porous material through which the activator and/or the gas-generating chemical, depending upon what component is encapsulation, may diffuse slowly to delay their reaction to generate gas and heat.

In some embodiments, the reaction between the gas-generating chemical and the activator may be delayed by a method other than encapsulating either or both of the gas-generating chemical and the activator. In some embodiments, the reaction may be delayed by introducing the gas-generating chemical and the activator into the subterranean formation in separate fluids. For example, in certain embodiments, the present disclosure provides a method comprising providing a subterranean formation and a first pad fluid comprising a first pad base fluid, micro-proppant particulates, and a gas generating chemical. The pad fluid may be introduced into the subterranean formation at a rate and pressure sufficient to create or enhance at least one fracture therein. The at least one fracture may be either a macrofracture or a microfracture, or combinations thereof. The micro-proppant particulates may be placed into the fracture, along with the gas-generating chemical. In some embodiments, the micro-proppant may be placed into the far reaches of a macrofracture, which may be very small, or within a microfracture to prop open portions or all of those fractures after hydraulic pressure is removed. A second pad fluid may thereafter be introduced into the subterranean formation, the second pad fluid comprising a second pad base fluid and an activator. The activator and the gas-generating chemical may then contact one another within the fracture and react together so as to generate gas and heat. The increased pressure and temperature as a result of the gas and heat released from the reaction of gas generator and activator may overcome the tensile strength of the formation, thereby leading to the formation or extension of microfractures. Thereafter, a fracturing fluid comprising a fracturing base fluid and macro-proppant particulates may be introduced into the subterranean formation so as to place the proppant particulates within the fracture and form a proppant pack therein. The proppant pack may be formed by both the micro-proppant particulates and the macro-proppant particulates. In some embodiments, the first pad fluid may comprise the activator and not the gas-generating chemical and the second pad fluid may comprise the gas-generating chemical and not the activator. In some embodiments, the second pad fluid and the fracturing fluid may be introduced into the subterranean formation at the same pressure as the pad fluid (i.e., above the fracture gradient). In some embodiments, the steps of introducing the first and second pad fluids and the fracturing fluid may be repeated at a second treatment interval and up to as many treatment intervals as are present in a subterranean formation, depending on the operations being performed.

In some embodiments, the pad fluid and/or the first pad fluid may be introduced into the subterranean formation at a rate and pressure sufficient to create or enhance the at least one fracture in the first treatment interval. In some embodiments, the pad fluid (including the first and second pad fluid) and/or the fracturing fluid may be introduced into the subterranean formation using a hydrojetting tool. The hydrojetting tool may be connected to a tubular member and have a hydrojetting nozzle. The hydrojetting tool may be configured such that fluid flowed therethrough and out the hydrojetting nozzle may be at a pressure sufficient to create or enhance a fracture in a subterranean formation. In some embodiments, the pad fluid and/or the first pad fluid may be introduced into the subterranean formation through the hydrojetting tool and out the hydrojetting nozzle at a rate and pressure sufficient to create the at least one fracture.

The tubular member of the hydrojetting tool may be within the subterranean formation such that an annulus is formed between the tubular member and the subterranean formation. In some embodiments, either the pad fluid or the fracturing fluid may be introduced into the subterranean formation through the hydrojetting tool and the other of the pad fluid or the fracturing fluid may be introduced into the subterranean formation through the annulus. In other embodiments, the pad fluid may be introduced through the hydrojetting tool, followed immediately by introduction of the fracturing fluid through the same hydrojetting tool. In those embodiments in which a first pad fluid and a second pad fluid are used, one of the first pad fluid or the second pad fluid may be introduced into the subterranean through the hydrojetting tool and the other of the first pad fluid or the second pad fluid may be introduced into the subterranean formation through the annulus. The fracturing fluid may then be introduced either through the annulus or through the same hydrojetting tool.

The gas-generating chemical for use in conjunction with the embodiments described herein may be any chemical capable of producing gas in a subterranean formation when reacted with an activator. In some embodiments, the gas-generating chemical is in the form of a solid particulate. The gas-generating chemical may preferably generate nitrogen and ammonia, wherein a greater amount of nitrogen is generated than ammonia. When a gas-generating chemical is selected that contains an amide group, nitrogen may be produced with lesser amounts of ammonia, carbon dioxide, and carbon monoxide being produced. In other embodiments, the gas-generating chemical may generate carbon dioxide.

Suitable nitrogen producing gas-generating chemicals for use in the present disclosure may include, but are not limited to, an azo-based compound; a hydrazide-based compound; and any combinations thereof. Examples of suitable azo-based and hydrazide-based compounds may include, but are not limited to, hydrazine; azodicarbonamide; azobis (isobutyronitrile); p toluene sulfonyl hydrazide; p-toluene sulfonyl semicarbazide; carbonhydrazide; and p-p' oxybis (benzenesulfonylhydrazide). Of these, azodicarbonamide and carbonhydrazide are preferred. Nitrogen producing gas-generating chemicals that do not contain an azo-based or a hydrazide-based compound may also be used in the methods of the present disclosure including, but not limited to, ammonium salts of organic acids; ammonium salts of inorganic acids; hydroxylamine sulfate; carbamide; and any combinations thereof. Suitable carbon dioxide producing gas-generating chemicals may include, but are not limited to, an acidic salt of an alkali metal; a neutral salt of an alkali metal; an acidic salt of an alkaline earth metal; a neutral salt of an alkaline earth metal; organic acids; inorganic acids; and any combinations thereof.

In some embodiments, the gas-generating chemical may be formed by two components. The first component of the gas-generating chemical may be an ammonium-containing compound and the second component of the gas-generating chemical may be a nitrite-containing compound. In the presence of the activator, the ammonium-containing compound and the nitrite-containing compound may react generate nitrogen gas and heat. In certain embodiments, the first and/or second component may be encapsulated and/or the activator may be encapsulated. In other embodiments, the activator may be introduced into the subterranean formation in a separate fluid so as to delay the generation of the gas and heat. Suitable ammonium-containing compounds may include, but are not limited to, ammonium chloride; ammonium bromide; ammonium nitrate; ammonium sulfate; ammonium carbonate; ammonium hydroxide; ammonium acetate; ammonium borates; ammonium chromate; ammonium dichromate; ammonium cyanides; ammonium glutamate; ammonium molybdate; ammonium oxalate; ammonium phosphate dibasic; ammonium phosphate monobasic; ammonium sulfamate; ammonium thiosulfate; and any combination thereof. Suitable nitrite-containing compounds may include, but are not limited to, sodium hypochlorite; sodium nitrite; potassium nitrate; and any combination thereof. In some embodiments, the first component and the second component may be present in a ratio between about 1:1, 1:2, 1:3, 1:4, 1:5, 1:6, 1:7, 1:8, 1:9, and 1:10 to about 1:20, 1:19, 1:18, 1:17, 1:16, 1:15, 1:14, 1:13, 1:12, 1:11, and 1:10.

In some embodiments, the gas-generating chemical may be present such that the pad fluid (including either the first or second pad fluid) may exhibit a gas quality upon reaction with the activator in the range from a lower limit of about 5%, 10%, 25%, 40%, 50%, 60%, or 70% to an upper limit of about 95%, 90%, 80%, 75%, 60%, or 50% gas volume, and wherein the gas quality may range from any lower limit to any upper limit and encompass any subset therebetween. Most preferably, the pad fluid may have a gas quality from about 60% to about 95%, or about 70% to about 95%. Typically, the gas-generating chemical is present in an amount ranging from a lower limit of about 75%, 75.5%, 76%, 76.5%, 77%, 77.5%, 78%, 78.5%, 79%, 79.5%, and 80% to an upper limit of about 85%, 84.5%, 84%, 83.5%, 83%, 82.5%, 82%, 81.5%, 81%, 80.5%, and 80% by volume of the pad fluid.

The activators of the embodiments described herein may be capable of causing, or "activating," the gas-generating chemical to generate gas upon encountering a particular stimuli, such as, for example, temperature, pH, salinity, the passage of time, and the like. In some instances, a delayed encapsulated activator may be capable of activating the gas-generating chemical upon encountering multiple stimuli. Suitable activators may include, but are not limited to, an alkali metal-containing material; an alkaline earth metal-containing compound; and any combinations thereof. Examples of suitable alkali metal- and alkaline metal-containing activators include, but are not limited to, carbonate; hydroxide; lithium salt; sodium salt; persulfate; perborate; hypochlorite; hypobromite; chlorite; chlorate; iodate; bromate; chloroaurate; arsenate; antimonite; molybate anion. Oxidizing agents of alkali metal- and alkaline metal-containing materials may include, but are not limited to, ammonium persulfate; sodium persulfate; potassium persulfate; sodium chlorate; sodium chlorate; hydrogen peroxide; sodium perborate; and sodium peroxy carbonate.

In some embodiments, the activator may be present in the pad fluid (including the first and/or second pad fluid) in a range from a lower limit of about 0.01%, 0.05%, 0.1%, 0.5%, 1%, 2.5%, 5%, 7.5%, 10%, and 12.5% to an upper limit of about 25%, 22.5%%, 20%, 17.5%, 15%, and 12.5% by weight of the gas-generating chemical. In preferred embodiments, the activator may be present in a range from about 1% to about 10% by weight of the gas-generating chemical.

In some embodiments, the gas-generating chemical and/or the activator described herein may be encapsulated. Encapsulation may be achieved by any method known in the art such that the reaction between the gas-generating chemical and the activator is delayed. In some embodiments, the encapsulating material may be coated onto the gas-generating chemical or the activator by mixing, spray coating, or any other method. Suitable encapsulating materials may include, but are not limited to, a wax; a drying oil (e.g., tung oil, linseed oil, and the like); a polyurethane; a cross-linked partially hydrolyzed polyacrylic; and any combinations thereof. By way of example, a wax encapsulation may release in the presence of sufficient temperature to melt the wax coating.

In some embodiments, the pad fluid (including the first and second pad fluid) and/or the fracturing fluid may further comprise a surface modification agent. In such embodiments, the micro-proppant particulates and/or the macro-proppant particulates may be at least partially coated with the surface modification agent by virtue of the surface modification agent being present in the pad fluid and/or the fracturing fluid. In other embodiments, the micro-proppant particulates may be coated with a surface modification agent and the surface modification agent may be capable of holding the gas-generating chemical and/or the activator onto the micro-proppant particulate, which may facilitate placement of the micro-proppant particulates into the microfracture formed by the generated gas and heat. In such embodiments, generally either the gas-generating chemical and/or the activator are encapsulated with an encapsulating material.

The surface modification agent may be included in the pad fluid and/or the fracturing fluid to facilitate aggregation of the micro-proppant particulates and/or the proppant particulates to one another and/or to the subterranean formation (e.g., the microfracture and macrofracture). In some embodiments, the surface modification agent may be coated onto the micro-proppant particulates and form a tacky coating to hold the gas-generating chemical and/or the activator thereon. As used herein, the term "tacky" refers to a substance that is somewhat sticky to the touch.

Suitable surface modification agents for use in the present disclosure may include, but are not limited to, a non-aqueous tackifying agent; an aqueous tackifying agent; a silyl-modified polyamide compound; a binder; a curable resin composition (e.g., a composition capable of curing to form hardened substance); a silane-based tackifying resin; a silane-based curable resin; and any combination thereof. Surface modification agents may be applied on-the-fly by including the surface modification agent in the pad fluid and/or fracturing fluid at the well site directly prior to pumping the fluids into the formation, or may be applied to coat the proppant particulates at the well site, directly before including the coated proppant particulates into the pad fluid to be pumped into the formation. In some embodiments, the gas-generating chemical and/or the activator may adhere to coated micro-proppant particulates due to their presence in the pad fluid; in other embodiments, the gas-generating chemical and/or the activator may be pre-placed onto the coated micro-proppant particulates before they are included in the pad fluid. As used herein, the term "on-the-fly" refers to performing an operation during a subterranean treatment that does not require stopping normal operations.

Non-aqueous tackifying agents suitable for use in the pad fluid and/or fracturing fluid may comprise any compound that, when in liquid form or in a solvent solution, will form a non-hardening coating upon a particulate. A particularly preferred group of non-aqueous tackifying agents may comprise polyamides that are liquids or in solution at the temperature of the subterranean formation such that they are, by themselves, non-hardening when introduced into the subterranean formation. A particularly preferred product may be a condensation reaction product comprised of polyacid(s) and a polyamine. Such products may include compounds such as mixtures of $C_{36}$ dibasic acids containing some trimer and higher oligomers and also small amounts of monomer acids that are reacted with polyamines. Other polyacids may include trimer acids, synthetic acids produced from fatty acids, maleic anhydride, acrylic acid, and the like. Additional compounds which may be used as non-aqueous tackifying agents may include liquids and solutions of, for example, polyesters, polycarbonates and polycarbamates, natural resins such as shellac, and the like.

Non-aqueous tackifying agents suitable for use in the embodiments disclosed herein may be used such that they form a non-hardened coating, or may be combined with a multifunctional material capable of reacting with the non-aqueous tackifying compound to form a hardened coating. A "hardened coating" as used herein means that the reaction of the non-aqueous tackifying agent with the multifunctional material will result in a substantially non-flowable reaction product that exhibits a higher compressive strength in a consolidated agglomerate than the non-aqueous tackifying agent alone. In this instance, the non-aqueous tackifying agent may function similarly to a hardenable resin. Multifunctional materials suitable for use in the present disclosure may include, but are not limited to, an aldehyde (e.g., formaldehyde); a dialdehyde (e.g., glutaraldehyde, hemiacetals or aldehyde releasing compounds); a diacid halide; dihalide (e.g., dichlorides and dibromides); a polyacid anhydride (e.g., citric acid, epoxides, furfuraldehyde, glutaraldehyde or aldehyde condensates); and any combination thereof. In some embodiments, the multifunctional material may be mixed with the non-aqueous tackifying agent in an amount of from a lower limit of about 0.01%, 0.5%, 0.1%, 0.5%, 1%, 5%, 10%, and 15% to an upper limit of about 50%, 45%, 40%, 35%, 30%, 25%, 20%, and 15% by weight of the non-aqueous tackifying agent. In other embodiments, the multifunctional material may be mixed with the non-aqueous tackifying agent in an amount of from about 0.5% to about 1% by weight of the non-aqueous tackifying agent.

Solvents suitable for use with the non-aqueous tackifying agents may include any solvent that is compatible with the non-aqueous tackifying agent and achieves the desired viscosity effect. The solvents that can be used in the embodiments disclosed herein may preferably include those having high flash points (most preferably above about 125° F. (51.7° C.)). Examples of solvents suitable for use in the embodiments herein with the non-aqueous tackifying agents may include, but are not limited to, butylglycidyl ether; dipropylene glycol methyl ether; dipropylene glycol dimethyl ether; diethyleneglycol methyl ether; ethyleneglycol butyl ether; methanol; butyl alcohol; isopropyl alcohol; diethyleneglycol butyl ether; propylene carbonate; d'limonene; 2-butoxy ethanol; butyl acetate; furfuryl acetate; butyl lactate; dimethyl sulfoxide; dimethyl formamide; fatty acid methyl ester; and any combination thereof. It is within the ability of one skilled in the art, with the benefit of this disclosure, to determine whether a solvent is needed to achieve a viscosity suitable to the subterranean conditions and, if so, how much.

Suitable aqueous tackifying agents are not significantly tacky when included in the pad fluid and/or fracturing fluid or when coated onto the proppant particulates described herein, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of the proppant particulates to prepare them to be coated with an aqueous tackifying agent. Suitable aqueous tackifying agents may generally be charged polymers that comprise compounds that, when in an aqueous solvent or solution, will form a non-hardening coating (by itself or with an activator).

Examples of aqueous tackifying agents suitable for use in the embodiments herein may include, but are not limited to, an acrylic acid polymer; an acrylic acid ester polymer; an acrylic acid derivative polymer; an acrylic acid homopolymers; an acrylic acid ester homopolymer (e.g., poly(methyl acrylate), poly(butyl acrylate), and poly(2-ethylhexyl acrylate)); an acrylic acid ester copolymer; a methacrylic acid derivative polymer; a methacrylic acid homopolymer; a methacrylic acid ester homopolymer (e.g., poly(methyl methacrylate), poly(butyl methacrylate), and poly(2-ethylhexyl methacrylate)); an acrylamido-methyl-propane sulfonate polymer; an acrylamido-methyl-propane sulfonate derivative polymer; an acrylamido-methyl-propane sulfonate copolymer; an acrylic acid/acrylamido-methyl-propane sulfonate copolymer; and any combination thereof.

Silyl-modified polyamide compound may be used as the surface modification agent in some embodiments described herein. The silyl-modified polyamide compounds suitable for use as a surface modification agent in the methods of the present disclosure may be described as substantially self-hardening compositions. Suitable silyl-modified polyamide compounds may be capable of at least partially adhering to the proppant particulates described herein in the unhardened state, and that are further capable of self-hardening into a substantially non-tacky state. Such silyl-modified polyamide compounds may be based, for example, on the reaction product of a silylating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the entire disclosure of which is herein incorporated by reference.

Binders suitable for use as the surface modification agent of the embodiments described herein may generally comprise a heterocondensate of (1) a hydrolysable silicon compound having at least one non-hydrolysable organic radical without polymerizable group and (2) a metal and/or boron compound. Such binders may be prepared by hydrolyzing (1), above, with water; adding (2), above, to the resultant reaction mixture after the water in the reaction mixture is substantially consumed; and, optionally, adding an organic binder component to the heterocondensate and/or a precursor thereof.

In addition, binders suitable for use in the embodiments described herein may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the present disclosure may generally comprise:
(I) a consolidant comprising a hydrolyzate or precondensate of
(a) at least one organosilane of the general formula (I):

$$R_nSiX_{4-n} \quad (I)$$

in which the R radicals are the same or different and are each hydrolytically non-removable groups, the X radicals are the same or different and are each hydrolytically removable groups or hydroxyl groups and n is 1, 2 or 3,
(b) optionally at least one hydrolyzable silane of the general formula (II)

$$SiX_4 \quad (II)$$

in which the X radicals are each as defined above, and
(c) at least one metal compound of the general formula (III)

$$MX_a \quad (III)$$

in which M is a metal of main groups I to VIII or of transition groups II to VIII of the Periodic Table of the Elements including boron, X is as defined in formula (I), where two X groups may be replaced by one oxo group, and a corresponds to the valence of the element,
where the molar ratio of silicon compounds used to metal compounds used is in the range from 8000:1 to 8:1,
is infiltrated or injected into the geological formation and,
(II) the consolidant is cured under elevated pressure and elevated temperature,
where the consolidant, in the case that it is used to change the wetting behavior of the formation, also comprises an oleophobic and hydrophobic component. Comprehensive investigations have shown that these consolidants are not decomposed even in autoclaves at high pressure and high temperature even over a prolonged period, and also still form a stable bond under these conditions. In the case of use of a wetting-regulating consolidation variant, it was shown that the wetting behavior established is retained after a hydrothermal treatment in corrosive medium. The consolidation also reduces the porosity only to a slight degree.

Curable resins suitable for use as the surface modification agent in some embodiments described herein may be any resins known in the art that are capable of forming a hardened, consolidated mass. Some suitable curable resins may include, but are not limited to, a two component epoxy based resins; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a polyester resin hybrid; a polyester resin copolymer; a polyurethane resin; a polyurethane resin hybrid; a polyurethane resin copolymer; an acrylate resin; a silicon-based resin; and any combination thereof. Some suitable curable resins, such as epoxy resins, may be cured with an internal catalyst or activator so that when pumped down hole, they may be cured using only time and temperature. Other suitable curable resins, such as furan resins generally require a time-delayed catalyst or an external catalyst to help activate the polymerization of the resins if the cure temperature is low (i.e., less than 250° F. (121.1° C.)), but will cure under the effect of time and temperature if the formation temperature is above about 250° F. (121.1° C.), preferably above about 300° F. (148.9° C.). It is within the ability of one skilled in the art, with the benefit of this disclosure, to select a suitable curable resin for use in embodiments described herein and to determine whether a catalyst is required to trigger curing.

Any solvent that is compatible with the curable resin and achieves the desired viscosity effect is suitable for use in the embodiments described herein. Preferred solvents include those listed above in connection with tackifying agents. It is within the ability of one skilled in the art, with the benefit of this disclosure, to determine whether and how much solvent is needed to achieve a suitable viscosity.

Generally, the surface modification agent may be added in any amount capable of aggregating the proppant particulates, contacting the subterranean formation to adhere proppant particulates thereto, coating the proppant particulates, or coating the micro-proppant particulates such that the gas-generating chemical and/or the activator may adhere thereto. In some embodiments, the surface modification agent may be present in an amount of from about 0.1%, 0.2%, 0.3%, 0.4%, 0.5%, 0.6%, 0.7%, 0.8%, 0.9%, 1%, 1.2%, 1.3%, 1.4%, and 1.5% to about 3%, 2.9%, 2.8%, 2.7%, 2.6%, 2.5%, 2.4%, 2.3%, 2.2%, 2.1%, 2.0%, 1.9%, 1.8%, 1.7%, 1.6%, and 1.5% by weight of the proppant particulates.

The pad fluid (including the first and second pad fluid) and the fracturing fluid may be collectively referred to herein as "treatment fluids." The pad fluid may comprise a pad base fluid (or a first and second pad base fluid) and the fracturing fluid may comprise a fracturing base fluid, both of which may be collectively referred to herein as "base fluids." The base fluid selected for the pad fluid, the first or second pad fluid or the fracturing fluid may be alike or each different, depending on the subterranean operation being performed, or based on other factors. For example, where a single pad fluid is used, the pad fluid and the fracturing fluid may both comprise the same type base fluid, or the pad fluid may comprise one type of base fluid and the fracturing fluid may comprise another type of base fluid. In those embodiments where a dual pad fluid is used, the first pad fluid, the second pad fluid, and the fracturing fluid may comprise the same type of base fluid. In other embodiments, the first pad fluid, the second pad fluid, and the fracturing fluid may each comprise a different type of pad fluid. In yet other embodiments, two of the first pad fluid, the second pad fluid, and the fracturing fluid may comprise the same type base fluid and the third may comprise a different type of base fluid.

The treatment fluids may comprise any base fluid capable of being delivered to a subterranean formation. Suitable base fluids may include, but not be limited to, oil-based fluids; aqueous-based fluids; aqueous-miscible fluids; water-in-oil emulsions; oil-in-water emulsions; and any combination thereof. Suitable oil-based fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil and oil-in-water emulsions may comprise any water or oil component described herein. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Suitable oil-in-water emulsions may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

In some embodiments, the treatment fluids may further comprise a gelling agent. The gelling agent may be any substance (e.g., a polymeric material) capable of increasing the viscosity of the treatment fluid. In some embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents; synthetic gelling agents; and any combination thereof. Suitable gelling agents may include, but are not limited to, a polysaccharide; a biopolymer; and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, a guar gum (e.g., hydroxyethyl guar, hydroxypropyl guar, carboxymethyl guar, carboxymethylhydroxyethyl guar, and carboxymethylhydroxypropyl guar); a cellulose; a cellulose derivative (e.g., hydroxyethyl cellulose, carboxyethylcellulose, carboxymethylcellulose, and carboxymethylhydroxyethylcellulose); xanthan; scleroglucan; succinoglycan; diutan; and any combination thereof.

Suitable synthetic polymers for use as gelling agents may include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamido-alkyl trialkyl ammonium salts; methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof; and any combination thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In other embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids of the embodiments described herein in an amount sufficient to provide the desired viscosity. In some embodiments, the gelling agents (i.e., the polymeric material) may be present in an amount in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the treatment fluid. In certain embodiments, the gelling agents may be present in an amount in the range of from about 0.15% to about 2.5% by weight of the treatment fluid.

In those embodiments described herein where it is desirable to crosslink the gelling agent(s), the treatment fluid may comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, a borate ion; a magnesium ion; a zirconium IV ion; a titanium IV ion; an aluminum ion; an antimony ion; a chromium ion; an iron ion; a copper ion; a magnesium ion; a zinc ion; and any combination thereof. These ions may be provided by providing any compound that is capable of producing one or more of these ions. Examples of such compounds may include, but are not limited to, ferric chloride; boric acid; disodium octaborate tetrahydrate; sodium diborate; a pentaborate; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; an antimony compound; a chromium compound; an iron compound; a copper compound; a zinc compound; and any combination thereof. In certain embodiments, the crosslinking agent may be formulated to remain inactive until it is "activated" by, among other things, certain conditions in the treatment fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited, the type of gelling agent(s) selected, the molecular weight of the gelling agent(s) selected, the conditions in the subterranean formation being treated, the safety handling requirements, the pH of the treatment fluid, the temperature of the subterranean formation, the desired delay for the crosslinking agent to crosslink the gelling agent molecules, and the like.

When included, suitable crosslinking agents may be present in the treatment fluids useful in the embodiments described herein in an amount sufficient to provide the desired degree of crosslinking between molecules of the gelling agent. In certain embodiments, the crosslinking agent may be present in an amount in the range of from a lower limit of about 0.005%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the treatment fluid. In certain embodiments, the crosslinking agent may be present in an amount in the range of from about 0.05% to about 1% by weight of the treatment fluid. One of ordinary skill in the art, with the benefit of this disclosure, will recognize the appropriate amount of crosslinking agent to include in a treatment fluid of the embodiments described herein based on a number of factors, such as the temperature conditions of a particular application, the type of gelling agents selected, the molecular weight of the gelling agents, the desired degree of viscosification, the pH of the treatment fluid, and the like.

In some embodiments, the treatment fluids may further comprise an additive selected from the group consisting of a salt; a weighting agent; a fluid loss control agent; an emulsifier; a dispersion aid; a corrosion inhibitor; an emulsion thinner; an emulsion thickener; a surfactant; a foaming agent; a gas; a pH control additive; a breaker; a biocide; a stabilizer; a chelating agent; a scale inhibitor; a gas hydrate inhibitor; a mutual solvent; an oxidizer; a reducer; a friction reducer; a clay stabilizing agent; and any combination thereof.

The proppant particulates (i.e., the micro-proppant particulates and the macro-proppant particulates) for use in the pad fluids and fracturing fluids described herein may be any material capable of propping open a fracture after hydraulic pressure is removed. Suitable materials for these proppant particulates may include, but are not limited to, sand; bauxite; ceramic material; glass material; polymeric material (e.g., ethylene-vinyl acetate or composite materials); polytetrafluoroethylene material; nut shell pieces; a cured resinous particulate comprising nut shell pieces; seed shell pieces; a cured resinous particulate comprising seed shell pieces; fruit pit pieces; a cured resinous particulate comprising fruit pit pieces; wood; composite particulates; and any combination thereof. Suitable composite particulates may comprise a binder and a filler material, wherein suitable filler materials may include, but are not limited to, silica; alumina; fumed carbon; carbon black; graphite; mica; titanium dioxide; barite; meta-silicate; calcium silicate; kaolin; talc; zirconia; boron; fly ash; hollow glass microspheres; solid glass; and any combination thereof. Suitable proppant particulates for use in conjunction with the embodiments described herein may be any known shape of material, including substantially spherical materials; fibrous materials; polygonal materials (e.g., cubic materials); and any combinations thereof.

In some embodiments, the micro-proppant particulates may be present in the pad fluid in an amount in the range of from a lower limit of about 0.01 pounds per gallon ("lb/gal"), 0.025 lb/gal, 0.05 lb/gal, 0.075 lb/gal, 0.1 lb/gal, 0.125 lb/gal, 0.15 lb/gal, 0.175 lb/gal, 0.2 lb/gal, 0.225 lb/gal, and 0.25 lb/gal to an upper limit of about 0.5 lb/gal, 0.475 lb/gal, 0.45 lb/gal, 0.425 lb/gal, 0.4 lb/gal, 0.375 lb/gal, 0.35 lb/gal, 0.325 lb/gal, 0.3 lb/gal, 0.275 lb/gal, and 0.25 lb/gal of the pad fluid. In some embodiments, the macro-proppant particulates may be present in the fracturing fluid in an amount in the range of from a lower limit of about 0.1 lb/gal, 0.5 lb/gal, 1 lb/gal, 1.5 lb/gal, 2 lb/gal, 2.5 lb/gal, and 3 lb/gal to an upper limit of about 6 lb/gal, 5.5 lb/gal, 5 lb/gal, 4.5 lb/gal, 4 lb/gal, 3.5 lb/gal, and 3 lb/gal of the fracturing fluid.

In various embodiments, systems configured for delivering the treatment fluids (i.e., pad fluid (including the first and second pad fluid) and the fracturing fluid) described herein to a downhole location are described. In various embodiments, the systems can comprise a pump fluidly coupled to a tubular, the tubular containing the treatment fluids described herein. It will be appreciated that while the system described below may be used for delivering either or both of the temporary sealant slurry and the fracturing fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the micro-proppant particulates and/or the micro-proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: (a) introducing a pad fluid into a subterranean formation at a rate and pressure sufficient to create or enhance at least one fracture therein, wherein the pad fluid comprises a pad base fluid, micro-proppant particulates, a gas-generating chemical, and an activator, and wherein either the gas-generating chemical or the activator or both are encapsulated; (b) placing the micro-proppant particulates, the gas-generating chemical, and the encapsulated activator into the at least one fracture; (c) releasing the activator from its encapsulation; (d) reacting the gas-generating chemical and the activator in the at least one fracture so as to generate gas and heat, thereby creating or enhancing at least one microfracture therein; (e) introducing a fracturing fluid into the subterranean formation, wherein the fracturing fluid comprises a fracturing base fluid and macro-proppant particulates; and (f) placing the macro-proppant particulates into the at least one fracture so as to form a proppant pack therein.

B. A method comprising: (a) introducing a first pad fluid into a subterranean formation at a rate and pressure sufficient to create or enhance at least one fracture therein, wherein the pad fluid comprises a first pad base fluid, micro-proppant particulates, and either a gas-generating chemical or an activator; (b) placing the micro-proppant particulates and the gas-generating chemical into the at least one fracture; (c) introducing a second pad fluid into the subterranean formation, wherein the second pad fluid comprises a second pad base fluid and either of the gas-generating chemical or the activator that is not present in the first pad base fluid; (d) reacting the gas-generating chemical and the activator in the at least one fracture so as to generate gas and heat, thereby creating or enhancing at least one microfracture therein; (e) introducing a fracturing fluid into the subterranean formation, wherein the fracturing fluid comprises a fracturing base fluid and macro-proppant particulates; and (f) placing the macro-proppant particulates into the at least one fracture so as to form a proppant pack therein.

Each of embodiments A, B, and C may have one or more of the following additional elements in any combination:

Element 1: Further comprising repeating steps (a) through (f) at least at a second treatment interval.

Element 2: Wherein the micro-proppant particulates have a size in the range of from about 1 μm to about 150 μm.

Element 3: Wherein either the gas-generating chemical or the activator or both are encapsulated.

Element 4: Further comprising providing a hydrojetting tool connected to a tubular member within the subterranean formation and introducing at least one of the pad fluid and the fracturing fluid into the subterranean formation through the hydrojetting tool.

Element 5: Further comprising providing a hydrojetting tool connected to a tubular member within the subterranean formation and introducing at least one of the first pad fluid, the second pad fluid, and the fracturing fluid into the subterranean formation through the hydrojetting tool.

Element 6: Further comprising providing a hydrojetting tool connected to a tubular member within the subterranean formation, so as to create an annulus between the tubular member and the subterranean formation and introducing at least one of the pad fluid and the fracturing fluid into the subterranean formation through the annulus.

Element 7: Further comprising providing a hydrojetting tool connected to a tubular member within the subterranean formation, so as to create an annulus between the tubular member and the subterranean formation and introducing at least one of the first pad fluid, the second pad fluid, and the fracturing fluid into the subterranean formation through the annulus.

Element 8: Wherein the micro-proppant particulates are coated with a surface modification agent, the surface modification agent holding the gas-generating chemical and/or the activator onto the micro-proppant particulates.

Element 9: Wherein the surface modification agent is selected from the group consisting of a non-aqueous tackifying agent; an aqueous tackifying agent; a silyl-modified polyamide compound; a binder; a curable resin composition; and any combination thereof.

Element 10: Wherein the gas-generating chemical comprises a first component and a second component, the first component comprising an ammonium-containing compound and the second component comprising a nitrite-containing compound.

Element 11: Wherein the gas-generating chemical generates a gas selected from the group consisting of nitrogen; ammonia; carbon dioxide; carbon monoxide; or any combination thereof.

Element 12: Wherein the gas-generating chemical is selected from the group consisting of an azo-based compound; a hydrazide-based compound; or any combination thereof.

Element 13: Wherein at least one of the pad fluid and the fracturing fluid is introduced into the subterranean formation using a pump.

Element 14: Wherein at least one of the first pad fluid, the second pad fluid, and the fracturing fluid is introduced into the subterranean formation using a pump.

By way of non-limiting example, exemplary combinations applicable to A, B, C include: A with 1, 4, and 6; A with 2 and 8; B with 2, 5, and 7; B with 3 and 9.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
(a) introducing a pad fluid into a subterranean formation at a rate and pressure sufficient to create or enhance at least one fracture therein,
wherein the pad fluid comprises a pad base fluid, micro-proppant particulates, a gas-generating chemical, and an activator, and wherein either the gas-generating chemical or the activator or both are encapsulated;
(b) placing the micro-proppant particulates, the gas-generating chemical, and the activator into the at least one fracture;
(c) releasing either the gas-generating chemical or the activator or both from encapsulation;
(d) reacting the gas-generating chemical and the activator in the at least one fracture so as to generate gas and heat, thereby creating or enhancing at least one microfracture therein;
(e) introducing a fracturing fluid into the subterranean formation,
wherein the fracturing fluid comprises a fracturing base fluid and macro-proppant particulates; and
(f) placing the macro-proppant particulates into the at least one fracture so as to form a proppant pack therein.

2. The method of claim 1, further comprising repeating steps (a) through (f) at a second treatment interval.

3. The method of claim 1, wherein the micro-proppant particulates have a size in the range of from about 1 μm to about 150 μm.

4. The method of claim 1, further comprising providing a hydrojetting tool connected to a tubular member within the subterranean formation and introducing at least one of the pad fluid and the fracturing fluid into the subterranean formation through the hydrojetting tool.

5. The method of claim 1, further comprising providing a hydrojetting tool connected to a tubular member within the subterranean formation, so as to create an annulus between the tubular member and the subterranean formation and introducing at least one of the pad fluid and the fracturing fluid into the subterranean formation through the annulus.

6. The method of claim 1, wherein the micro-proppant particulates are coated with a surface modification agent, the surface modification agent holding the gas-generating chemical and/or the activator onto the micro-proppant particulates.

7. The method of claim 6, wherein the surface modification agent is selected from the group consisting of a non-aqueous tackifying agent; an aqueous tackifying agent; a silyl-modified polyamide compound; a binder; a curable resin composition; and any combination thereof.

8. The method of claim 1, wherein the gas-generating chemical comprises a first component and a second component, the first component comprising an ammonium-containing compound and the second component comprising a nitrite-containing compound.

9. The method of claim 1, wherein the gas-generating chemical is selected from the group consisting of an azo-based compound; a hydrazide-based compound; or any combination thereof.

10. The method of claim 1, wherein at least one of the pad fluid and the fracturing fluid is introduced into the subterranean formation using a pump.

11. A method comprising:
(a) introducing a first pad fluid into a subterranean formation at a rate and pressure sufficient to create or enhance at least one fracture therein,
wherein the first pad fluid comprises a first pad base fluid, micro-proppant particulates, and either a gas-generating chemical or an activator;
(b) placing the micro-proppant particulates and the gas-generating chemical or the activator present in the first pad fluid into the at least one fracture;
(c) introducing a second pad fluid into the subterranean formation,
wherein the second pad fluid comprises a second pad base fluid and either of the gas-generating chemical or the activator that is not present in the first pad base fluid;
(d) reacting the gas-generating chemical and the activator in the at least one fracture so as to generate gas and heat, thereby creating or enhancing at least one microfracture therein;
(e) introducing a fracturing fluid into the subterranean formation,
wherein the fracturing fluid comprises a fracturing base fluid and macro-proppant particulates; and
(f) placing the macro-proppant particulates into the at least one fracture so as to form a proppant pack therein.

12. The method of claim 11, further comprising repeating steps (a) through (f) at a second treatment interval.

13. The method of claim 11, wherein either the gas-generating chemical or the activator or both are encapsulated.

14. The method of claim 11, wherein the micro-proppant particulates have a size in the range of from about 1 μm to about 150 μm.

15. The method of claim 11, further comprising providing a hydrojetting tool connected to a tubular member within the subterranean formation and introducing at least one of the first pad fluid, the second pad fluid, and the fracturing fluid into the subterranean formation through the hydrojetting tool.

16. The method of claim 11, further comprising providing a hydrojetting tool connected to a tubular member within the subterranean formation, so as to create an annulus between the tubular member and the subterranean formation and introducing at least one of the first pad fluid, the second pad fluid, and the fracturing fluid into the subterranean formation through the annulus.

17. The method of claim 11, wherein the gas-generating chemical comprises a first component and a second component, the first component comprising an ammonium-containing compound and the second component comprising a nitrite-containing compound.

18. The method of claim 11, wherein the gas-generating chemical is selected from the group consisting of an azo-based compound; a hydrazide-based compound; or any combination thereof.

19. The method of claim 11, wherein the micro-proppant particulates are coated with a surface modification agent, the surface modification agent holding either the gas-generating chemical or the activator onto the micro-proppant particulates.

20. The method of claim 11, wherein at least one of the first pad fluid, the second pad fluid, and the fracturing fluid is introduced into the subterranean formation using a pump.

* * * * *